United States Patent [19]
Lerner et al.

[11] 3,827,283
[45] Aug. 6, 1974

[54] FLUID LEAKAGE MEASURING APPARATUS

[75] Inventors: Julius Lerner, Broomall; George F. Campbell, Jr., Glen Riddle, both of Pa.

[73] Assignee: Sun Oil Company of Pennsylvania, Philadelphia, Pa.

[22] Filed: Mar. 5, 1973

[21] Appl. No.: 337,961

[52] U.S. Cl............................... 73/40, 35/13, 35/49
[51] Int. Cl....................... G01m 3/04, G09b 25/04
[58] Field of Search............. 73/40, 46, 162; 35/13, 35/49

[56] References Cited
UNITED STATES PATENTS

| | | | |
|---|---|---|---|
| 2,310,974 | 2/1943 | Lumm | 73/4 R |
| 2,344,315 | 3/1944 | McCawley | 73/40 |
| 3,100,392 | 8/1963 | Skinner | 73/46 |

*Primary Examiner*—S. Clement Swisher
*Attorney, Agent, or Firm*—George L. Church; Donald R. Johnson; Frank A. Rechif

[57] ABSTRACT

A fluid manifold, to which high-pressure steam may be supplied, has coupled thereto a row of individually valved branch pipes each of which terminates in a respective leaky component (which produces a steam leak). A rotameter coupled to the manifold measures the quantity of steam escaping through a selected, typical leaky component. The assembly is arranged to be easily transportable.

4 Claims, 3 Drawing Figures

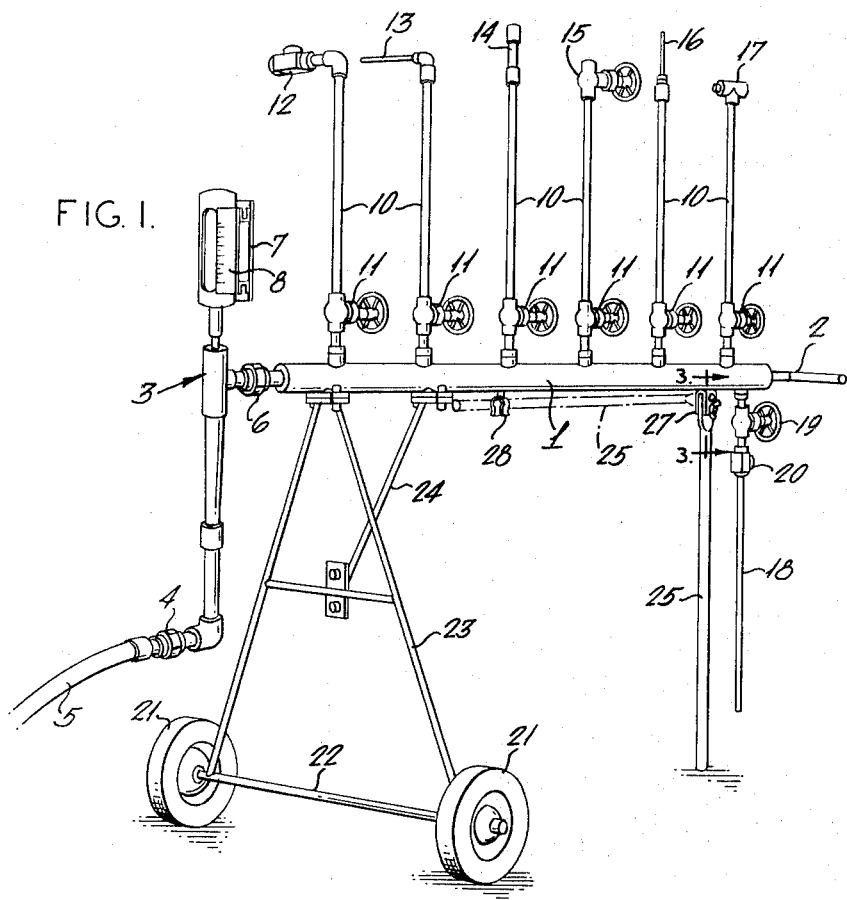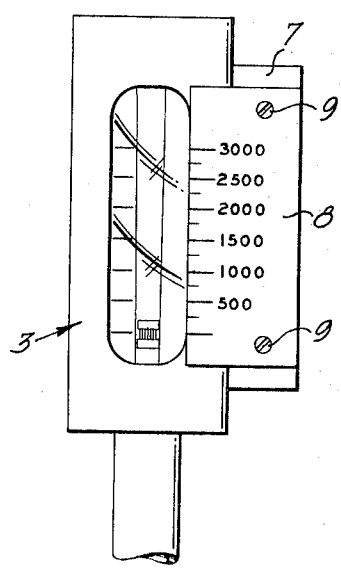

FLUID LEAKAGE MEASURING APPARATUS

This invention relates to an apparatus for displaying (exhibiting) and identifying fluid leaks, and more particularly to an apparatus for measuring and indicating, in a quantitative manner, steam leaks. Since the steam leaks displayed by the apparatus of the invention are typical or representative of actual steam leaks present in a processing facility, the apparatus may be thought of as being a trainer and demonstrator.

In an industrial processing complex such as a pteroleum refinery, steam is used in large quantities for various and divers purposes, such as the heating of process vessels, purging, the driving of pumps, thermal cracking, the fluidizing of catalyst, the decoking of tubes, etc. Over a period of time, as this steam passes through the various components (pipe fittings or joints, valves, steam traps, etc.) which are involved in its utilization, leaks fortuitously develop in such components. Each of these fortuitous leaks involves a monetary loss (taking into account, of course, the incremental steam cost in the refinery), and also contributes to noise pollution, by increasing the ambient noise level.

An object of this invention is to provide an apparatus for measuring, in a convenient manner, the leakage of fluid from a leaky fluid component.

Another object is to provide an apparatus for indicating (exhibiting) the monetary cost of a steam leak in a typical leaky steam component.

A further object is to provide an apparatus which can be operated to furnish an indication of the quantity of steam leaking through one leaky component compared to the quantity of steam leaking through various other leaky components.

A still further object is to provide an apparatus for quantitatively measuring fluid leakage from a leaky component.

Still another object is to provide apparatus of the foregoing character which is easily transportable and easily movable, whereby it may be easily moved to various locations for measurement and/or display purposes.

The objects of this invention are accomplished, briefly, in the following manner: A fluid flow conduit (pipe serving as a manifold), which is equipped with wheels so as to be easily movable, is adapted to be supplied from a source of high-pressure steam. A plurality of valved pipes are coupled at one end to the manifold, and respective, typical leaky steam components are coupled to the other ends of these pipes. A rotameter, having a scale marked in dollars per year, based on local steam costs and accounting methods, is connected to the steam inlet end of the manifold, to measure the steam flowing therethrough.

A detailed description of the invention follows, taken in conjunction with the accompanying drawing, wherein:

FIG. 1 is a perspective view of an apparatus according to this invention;

FIG. 2 is a view showing a detail; and

FIG. 3 is a sectional view on line 3—3 of FIG. 1.

The applicability or efficacy of the apparatus of this invention is based upon the premise that, in the location (e.g., in an area of a petroleum refinery) where the apparatus is to be used, atmospheric conditions permit visual observation of steam leak plumes. If a steam leak plume can be observed, it can readily be determined which particular component (steam trap, valve, pipe joint or fitting, pinched tube, or what-not) is leaky.

Referring now to the drawing, a length of 2-inch pipe 1 serves as a steam manifold; this manifold extends in a substantially horizontal direction during operation of the apparatus, as illustrated in the drawing. One end of this pipe is sealed, as by means of a suitable cap or plug, and to this end is welded the leg of a T-shaped solid rod subassembly 2 whose two arms form a handle by means of which the apparatus may be manipulated (moved to a desired position).

A rotameter, denoted generally by numeral 3, is coupled to the other end of manifold 1 to measure the quantity of steam flowing into such manifold. This rotameter is of conventional type, and is for example capable of quantitatively measuring nominal 135 psig leaks of from 1 pound per minute to 6 pounds per minute. For operation of the apparatus, the inlet side of rotameter 3 is connected through a coupling including a pipe union 4 to one end of an armored steam supply hose 5 whose other end is connected to a source of high-pressure steam (not shown). The outlet side of the rotameter is connected through a coupling including a pipe union 6 to the end of manifold pipe 1 opposite the T-handle 2, so that the steam supplied by way of hose 5 to the manifold 1 flows through the rotameter 3.

A mounting plate 7 is secured adjacent the indicating portion of rotameter 3, and a scale faceplate 8 (see FIG. 2) having dollars per year graduations is removably mounted (as by means of screws 9) on the mounting plate 7. Since the actual incremental steam cost in the refinery (in dollars per pound of steam) is known, it is a relatively simple matter to prepare such a scale faceplate, taking into account the original calibration of the rotameter (pounds of steam per minute). With the faceplate 8, the quantity of steam flowing through the conduit 1 is indicated in monetary units (dollars) per year.

A plurality of pipes 10 (illustrated as six in number) are each connected at their lower ends to the fluid flow conduit or manifold pipe 1. These pipes are preferably of ½-inch diameter, and they extend upwardly from pipe 1 in spaced, parallel relation. Each of the branch pipes 10 has therein, near its lower end, an individual manually operable shutoff valve (gate valve) 11. Thus, by operation of any selected one of the valves 11, steam from manifold 1 may be admitted to a corresponding one of the branch pipes 10.

A typical, representative leaky steam component is connected to the upper end of each one of the branch pipes 10. These leaky steam components may be of various types and, since they are threadably secured to the upper ends of the respective branch pipes, may be changed at will. Purely by way of example, the component connected to the first one (counting from the left in FIG. 1) of the branch pipes 10 is illustrated as a leaky steam trap 12. The leaky component connected to the second branch pipe is illustrated as a piece of small-diameter tubing 13 open at its outer end. The component connected to the third branch pipe 10 is shown as a leaky threaded pipe joint 14. The component connected to the fourth branch pipe is a leaky valve 15; the leaky component connected to the fifth branch pipe is a pinched tube 16; the component connected to the sixth branch pipe is a leaky tee fitting 17.

By opening one of the valves 11, steam may be caused to flow through a selected one of the leaky components 12–17 and, while the steam is leaking through the selected component, the quantity of steam lost through such component (by way of leakage) is measured by rotameter 3 and is indicated by scale 8 (in dollars per year).

If a steam leak plume can be visually observed in actual operating equipment (in a refinery), the location of the leak (and, hence, the leaky component) can be readily identified. Then, by use of the test or measuring apparatus of this invention, the leak can be duplicated (or demonstrated), by operation of the appropriate one of the valves 11 (to pass steam through the similar leaky component, in the test apparatus) and the actual steam loss (in dollars per year) read on scale 8. The magnitude of this steam loss constitutes quantitative data on which may be based a decision on which steam leaks (in the actual operating equipment) are worth repairing.

By using an audiometer in conjunction with the apparatus of this invention, the increase in the ambient noise level resulting from the leakage of steam through any of the leaky components 12–17 may be evaluated (i.e., actually measured). This would provide quantitative data indicating the abatement of the noise pollution which would be effected by repairing of the leak.

A pipe 18 is connected at its upper end to the manifold pipe 1, immediately adjacent the handle 2 and beyond (speaking with reference to the steam inlet end of the manifold) all of the branch pipes 10. A shutoff valve 19 (manually operable) is connected into the pipe 18 (immediately adjacent the manifold pipe 1), and below this a steam trap 20 is connected into pipe 18. Pipe 18 extends downwardly from the manifold pipe 18, and its lower end is open. During operation of the analyzer, the pipe 18 functions (if valve 19 is open) to drain out of the manifold any water which has condensed therein.

For easy local movement of the test or measuring apparatus, a pair of ground-engaging wheels 21 are journaled for rotation on the respective opposite ends of an axle 22 which is secured to the lower end of an A-frame 23, in turn detachably secured (as by bolting to a plate welded to the bottom of manifold pipe 1) at its upper end to pipe 1. A rigid bracing strut 24 is bolted at one end to the cross-member of the A-frame 23 and at its opposite end is detachably secured (in a manner similar to the A-frame) to pipe 1. The apparatus of the invention may be easily moved, locally, by grasping handle 2 and utilizing the wheels 21.

For supporting the apparatus during operation thereof with the manifold pipe 1 substantially horizontal, a rigid pivotable support leg 25 is utilized. The lower end of this leg is adapted to engage the ground or other supporting surface (to thereby form with the wheels 21 a tripod support for the apparatus), and the upper end of leg 25 is bolted by means of a pair of vertically spaced bolts 26 and 26' to a bracket 27 of inverted U-shape which is welded to the bottom of conduit 1, at the handle end of the same. Bolts 26 and 26' pass through clearance holes in the bracket 27 and in the leg 25, and are provided with nuts for tightly securing the leg to the bracket.

For transportation, the bolt 26' is removed, and the leg 25 is then pivoted on bolt 26 to a position approximately parallel to the pipe 1, a spring clip 28 of conventional construction (welded to pipe 1) being utilized to engage leg 25 and resiliently retain it in this latter position (shown in phantom in FIG. 1). To further collapse the apparatus, A-frame 23 (with wheels 21) and strut 24 are detached from pipe 1, and pipe 18 is unscrewed therefrom.

It may be noted that when leg 25 is folded (pivoted) to its collapsed position and pipe 18 is unscrewed, the apparatus may be readily towed behind a truck by means of its wheels 21; when the wheels 21 are also removed, the whole apparatus occupies only a relatively small volume and may be readily shipped for convenient transportation over long distances.

The invention claimed is:

1. Apparatus for exhibiting steam quantity leakage from a leaky component comprising a transportable steam flow conduit, means coupling said component to said conduit, means for connecting said conduit to a source of steam, and means coupled to said conduit for measuring and indicating the quantity of steam flowing through said conduit, and thence through said leaky component, in monetary units per year, based on a pre-established incremental steam cost.

2. Apparatus for exhibiting fluid quantity leakage from a selected one of a plurality of leaky components comprising a transportable fluid flow conduit, individual means for coupling each of said leaky components to said conduit, means for connecting said conduit to a fluid source, and means coupled to said conduit for measuring and indicating the quantity of fluid flowing through said conduit and thence through the selected leaky component.

3. Apparatus set forth in claim 2, wherein each of said coupling means comprises a valved pipe connected between each respective leaky component and said conduit.

4. Apparatus for exhibiting fluid quantity leakage from a selected one of a plurality of leaky components comprising a transportable fluid flow conduit, individual means for coupling each of said leaky components to said conduit, means for connecting said conduit to a fluid source, and a rotameter, responsive to fluid flow, coupled to said conduit for measuring and indicating the quantity of fluid flowing through said conduit and thence through the selected leaky component.

* * * * *